United States Patent Office 3,330,792
Patented July 11, 1967

3,330,792
HYDROCARBON WAX COMPOSITIONS
Norman G. Gaylord, New Providence, N.J., and George R. Mack, Jr., Allentown, and George G. Tauth, Easton, Pa., assignors to General Aniline & Film Corporation, New York, N.Y., a corporation of Delaware
No Drawing. Filed Feb. 11, 1964, Ser. No. 343,928
1 Claim. (Cl. 260—28.5)

This invention relates to improved hydrocarbon wax compositions and in particular to conventional aliphatic hydrocarbon waxes such as are derived from natural source materials or synthetically produced which are unexpectedly improved in their characteristics by the incorporation therewith of partially crystalline polymers derived from vinyl isobutyl ether.

The use of waxes and particularly paraffin waxes and waxes derived from the relatively low molecular weight polymerization of olefinic material such as ethylene, propylene, and the butenes, and the like as coating materials for various products, and particularly paper and paper-board materials is a tremendous industry employing upwards of about two billion pounds of such waxes. Relatively recently, the use of resin additives to improve the characteristics of such wax coatings has become more and more important since the consumer market has demanded improved properties in such wax coatings. Several resins have been offered for such purposes and among these, ethylene-vinyl acetate copolymers, ethylene-ethyl acrylate copolymers, and polyethylene have become the most important. While such materials have been used mainly because of improved properties of the resultant polymer-wax blends, nevertheless there is still tremendous room for improvement in this area by way of improved properties, by way of better economics, and by way of availability of materials. While at first blush it might appear a simple matter to improve the characteristics of the hydrocarbon waxes, it is not that simple to improve them in one area without detracting from some other characteristic in another area. The achievement, therefore, of an additive for a hydrocarbon wax composition which does not detract from the water vapor transmission rate, which improves the flexibility of the coating, which also improves the adhesion to various sub-strates and which can be used in the form of a hot melt, and which is compatible with the hydrocarbon waxes, is not only of tremendous practical importance always wanting in this field but is further a practical improvement of the highest order by virtue of the combination of properties which are wholly unforeseeable and unexpected.

The hydrocarbon wax compositions towards which the present invention is directed are, as pointed out above, coating compositions which are generally classified as hot melt compositions in contradistinction to solvent base compositions. The hot melt coating and adhesive compositions are quite extensively used because they are considerably cheaper than solvent based formulations, they give quick tack while in the molten state, they harden very quickly upon cooling, they have no residual solvent odor or taste, and their application is generally a simple one constituting a one step coating procedure. Solvent based formulations, on the other hand, are employed where it is not possible for the particular purpose or problem at hand to find an adequate hot melt composition. One might also resort to a solvent composition where any elevation of temperature necessary to effect hot melt coating would be detrimental in the coating procedure. Obviously, where the coating composition is readily susceptible to liquefaction at relative low temperatures, this offers the simplest and most economical means to coat various materials. Hydrocarbon waxes and particularly paraffin waxes are almost exclusively employed in hot melt form for coating purposes. Again, as pointed out above, almost two billion pounds of such materials are used annually to coat base materials, and particularly paper and paper-board to prepare such well known products as wax paper and waxed paper-board for containers, cartons and the like. While paraffin waxes and other similar hydrocarbon waxes as microcrystalline waxes and the low molecular weight waxy polyolefins perform quite well, there nevertheless exists considerable room for improvement with respect to flexibility, strength and adhesion of such waxes in the form of coatings on the various contemplated base materials. The relative inflexibility and brittleness of these waxes is well known and results in many applications and uses in excessive flaking of the coating, especially upon the flexing of the coated materials. This flaking patently results in leakage and increase in the water vapor transmission characteristics of the coated products. In addition to such deficiencies, the hydrocarbon waxes have poor adhesion characteristics for various base materials, and finally, are sadly lacking in their heat sealability properties.

An additive which is relatively inexpensive and which can markedly improve the flexibility and strength of hydrocarbon wax coatings, which can improve heat sealability and also adhesion to different types of sub-strate materials and which increases the viscosity of the hot melt, thereby giving less flow during laminating operations, which combine to give increased hot tack and peel strength, constitutes the major object of the present invention.

It is another major object of the present invention to provide new compositions which yield outstanding coatings on various and dissimilar types of base materials.

It is still another object of this invention to provide wax compositions, and particularly aliphatic hydrocarbon wax compositions which contain an additive in combination therewith which yield hot melt coating compositions of outstanding and improved flexibility and strength.

It is still a further object of the present invention to provide compositions, and particularly hot melt compositions based upon hydrocarbon waxy materials which exhibit outstanding adhesive characteristics for enumerable types of sub-strate materials as well as outstanding and increased hot tack and peel strength.

It is still another further object of the present invention to provide new, improved and highly useful aliphatic hydrocarbon wax compositions which are outstanding in their flexibility, strength and adhesion vis-a-vis the aliphatic hydrocarbon waxes per se.

Other objects will appear hereinafter as the description proceeds.

The compositions of the present invention comprise two essential components. The first component is the hydrocarbon wax and the second component is polyvinyl isobutyl ether. The hydrocarbon wax materials which are contemplated in this invention comprise the general class of aliphatic hydrocarbon waxy materials, the primary example of which is paraffin wax. Other hydrocarbon wax materials include the microcrystalline waxes and the solid waxy low molecular weight polymers derived from olefinic materials, and preferably those olefins of less than eight carbon atoms and most particularly polyethylene, polypropylene, and the polybutylenes. Paraffin wax is a generic term covering the hydrocarbon waxes derived from petroleum products and consist primarily of straight chain hydrocarbons which may have a minor amount of branching, particularly at the ends of the chain. The paraffin waxes form large, well-formed, distinct crystals of both the plate and needle types. The broad class of paraffin waxes is generally divided into three major subclasses of slack waxes, scale waxes and refined paraffin waxes. The slack waxes generally contain from about 20 to 40% oils, the scale waxes no more than about 2% oil, and the refined products are substantially free of oil. The industry standards are the crude scale waxes of melting point 118°–135° F. containing more than 0.5% oil whereas the fully refined waxes are those of melting points from about 118 to 155° F. and contain less than 0.5% oil. The microcrystalline waxes as a class differ from the paraffin waxes in their crystalline form. A microscope examination shows such crystals to be much smaller and are indistinct as compared to the distinct formations found in the paraffin waxes. The microcrystalline waxes generally range in molecular weights from about 400 to 700 with the average molecule containing from 40 to 50 carbon atoms. Further, these waxes usually contain a much larger percentage of branch chain hydrocarbons when compared with the paraffinic waxes. As with the paraffin waxes, the microcrystalline waxes are derived from petroleum products and generally from the residues of the initial distillations of the crude petroleum oil. The commercial microcrystalline waxes are given grade designations A through J with melting points varying from 147° to up to about 190° F. or higher. Some of the microcrystalline waxes are obtained from motor oil refining and others such as grades B, C and F from Midcontinent type crude oils.

The second major component of the compositions of the present invention is polyvinyl isobutyl ether, and specifically those polymers having partial crystallinity derived from stereospecific or isotactic polymerization procedures. It has been found that in order to achieve the optimum in properties of the compositions of the present invention, the relative degree of crystallinity of the polyvinyl isobutyl ether component should vary from about at least 14% to about 30%. Where the percent relative crystallinity is below about 14% and as the polymer approaches total amorphous form, the flexibility of the resultant wax blends therewith becomes very poor and approaches that of the unmodified hydrocarbon wax. Where the percent of relative crystallinity of the polymer is in excess of about 30%, it has been found that adhesion characteristics to various bases drops off so rapidly as to make such compositions, i.e., with hydrocarbon waxes, unacceptable for coating the various types of base materials which are normally employed with hydrocarbon waxes. In addition to the critical range of relative crystallinity of the polymers, it is also desirable that those polymers having intrinsic viscosities of from about 0.5 to about 10 be employed. Such a range of intrinsic viscosity characteristics represents the preferred molecular weight range of polyvinyl isobutyl ether products which in combination with hydrocarbon waxes, result in outstanding and unusual coatings manifested in the various improved properties discussed above, such as flexibility, strength, adhesion and the like.

The compositions of the present invention comprise as the major component the hydrocarbon wax, i.e., from about 50 to 99% and as the minor component the polyvinyl isobutyl ether, i.e., 1 to 50%. It is preferred that the ratio of hydrocarbon wax to polymer vary on a weight basis from about 99:1 to about 2:1 since within this range the most admirable properties are forthcoming along with the best economic picture.

The following examples will serve to illustrate the present invention without being deemed limitative thereof. Where parts are used, this will indicate parts by weight unless stated otherwise.

*Example 1*

The flexibility and adhesive qualities of various compositions of polyvinyl isobutyl ether with paraffin wax are evaluated by means of the following flex test carried out on 10 mil kraft board coated with the said various compositions. The coatings are laid down out of hot melts by means of an adjustable knife coater and average 2–3 mils in thickness. Strips of coated board ½" by 6" are cut for the test. The test consists of grasping the strip by the ends and bringing the center down over a smooth 8 mm. diameter glass rod to form a 180° bend. Maintaining constant contact with the rod, all portions of the strip are flexed twice over the radius of the rod, this constituting one cycle. The conditions of the coatings are then evaluated on a scale ranging from 1 to 10 after the strips have been flexed the indicated number of cycles. The evaluation scale takes into account the quality and extent of the flex cracking and delamination shown by the coating on the flexed strips and is set up as follows:

Rating 1—No signs of cracking or delamination of coating.
Rating 2—Very faint hairline cracks visible.
Rating 3—Fine cracking visible, not extensive; no delamination.
Rating 4—Fine cracking visible, extensive; no delamination.
Rating 5—Fine cracking visible plus slight delamination.
Rating 6—Pronounced cracks visible plus some delamination.
Rating 7—Pronounced cracking visible, approximately ⅓ total area delaminated.
Rating 8—Pronounced cracking visible, approximately ½ total area delaminated.
Rating 9—Pronounced cracking visible, approximately ⅔ total area delaminated.
Rating 10—Total area delaminated.

The ratings are tabulated in Table 1 together with the percent crystallinity. Under the heading of "Ratings, Room Temperature," there appear the sums of the ratings for 1, 10 and 50 cycles at room temperature, and under the heading "Ratings, Cold," the same sums are given for 1, 10 and 50 cycles but carried out at −18° C. The fourth column indicates the total ratings with the lowest number indicating the best product.

TABLE 1.—FLEXIBILITY EVALUATION RATINGS

| Sample | Room Temp. (24° C.) | Cold (−18° C.) | Total | Percent Relative Crystallinity |
| --- | --- | --- | --- | --- |
| A | 7 | 10 | 17 | 20 |
| B | 8 | 17 | 25 | 14.2 |
| C | 13 | 15 | 28 | 30.8 |
| D | 10 | 20 | 30 | 20.3 |
| E | 13 | 18 | 31 | 22 |
| F | 13 | 20 | 33 | 22 |
| G | 11 | 27 | 38 | 0 |
| H | 14 | 27 | 41 | 10 |
| I, wax | 24 | 29 | 53 | |

In the above table, samples A through H represent resin wax compositions containing 5 parts resin per 100 parts wax and sample I represents, as indicated, refined paraffin wax, melting point 141° F. From the above table it will be noted that out of a possible total rating number of 60, i.e., 30 at room temperature and 30 at −18° C., the paraffin wax coating approaches this maximum very closely. At room temperature after one cycle the unmodified paraffin wax rating is 6, which as described above indicates pronounced visible cracks and some delamination. After 10 cycles the rating is 8, which indicates about half of the total area has been delaminated, and after 50 cycles the rating is 10, indicating total delamination of the coating. At −18° C. the unmodified wax coating has a rating of 9 after one cycle, indicating ⅔ of the total has been delaminated, and after 10 cycles the rating is 10, indicating total delamination. While the use of 5 parts resin per 100 parts wax where the resin is non-crystalline (sample G), there is considerable improvement in the ratings although the cold flex rating is still poor. Sample H where the resin employed has 10% relative crystallinity, shows no improvement over the amorphous polymer and is somewhat less advantageous than the amorphous material at room temperature. In contradistinction to these three samples, each of the others wherein the relative crystallinity varies from about 14% to about 30% shows a vast improvement in total rating and exceptional improvement in the cold rating characteristics.

Example 2

In this example the viscosity increase of the hot melt polymer wax blends is demonstrated and the outstanding performance of the polyvinyl isobutyl ether with a degree of crystallinity within the scope of the present teachings is clearly evident.

Polymer wax blends are prepared at 5% and 10% concentration in refined paraffin wax, melting point 141° F., by dissolving the polymers in the molten wax at 250° F. with stirring. Viscosities are then determined with a Brookfield Viscosimeter at 200±1° F., 250±1° F. and 300±1° F. In the following Table 2 the results are tabulated wherein viscosities are in centipoises.

TABLE 2

| Sample | Composition | 200° F. Conc. | | Viscosity 250° F. Conc. | | 300° F. Conc. | |
|---|---|---|---|---|---|---|---|
| | | 5% | 10% | 5% | 10% | 5% | 10% |
| 1 | Wax plus resin (20% crystallinity) | 44 | 200 | 20 | 81 | 9.1 | 37 |
| 2 | Wax minus resin (10% crystallinity) | 16 | 95 | 11 | 56 | 6.2 | 33 |
| 3 | Wax | 6 | | 4.3 | | 3.0 | |

From the above it is clearly evident that the addition of the 20% crystalline polymer at the three temperatures indicated gives a vast improvement in viscosity not only over the unmodified wax but also over the blend containing the 10% crystalline polymer as well.

Example 3

In this example the water vapor transmission rates of glassine paper coated with various compositions are determined. Three compositions are used as coatings. The first is refined paraffin wax, melting point 141° F., the second a similar wax containing 20 parts resin per 100 parts wax of non-crystalline polyvinyl isobutyl ether, and the third a similar wax containing 20 parts resin per 100 parts wax of polyvinyl isobutyl ether of relative crystallinity of 21%. The glassine paper is dipped in the molten compositions and allowed to cool in air. The coated glassine is then passed between steam-heated glass tubing having a clearance of 5 mils. The sheets are cut into 4" x 4" pieces, weighed, "miked," spark tested for pinholes and cut into water vapor transmission rate specimens. Data is obtained on both flat and creased specimens, the latter prepared as outlined in TAPPI T 465 sm 52. The unmodified wax coated glassine gives a rate in grams per 100 sq. in. per 24 hrs. of 1.30 for the flat specimen and 4.62 for the creased specimen. The second sample containing 20% non-crystalline polymer give a water vapor transmission rate for the flat specimen of 0.40 gram per 100 sq. in. per 24 hrs. and the creased specimen a rate of 2.50 gms. per 24 hrs. The third sample containing 20% of crystalline polymer gives a flat specimen transmission rate of 0.24 gm. per 100 sq. in. per 24 hrs. and the corresponding specimen 2.04 gms. per 100 sq. in. per 24 hrs. The above indicates that while both polymer blends improve (i.e., lower) the water vapor transmission characteristics of coated glassine paper, the partially crystal material is still far superior to the amorphous one, however.

In a similar test employing a commercially available ethylene-vinyl acetate copolymer (20% concentration) in the same refined paraffin wax, the results for the flat and creased specimens are 0.32 and 2.07 gms. per 100 sq. in. per 24 hrs., respectively. Again, the improvement resulting by the use of crystalline polyvinyl isobutyl ether versus this copolymer is demonstrated.

Example 4

In addition to the above described improved characteristics of the wax polymer blends of the present invention, it is significant and of more than a little interest from a practical point of view to note that the partially crystalline polymers employed in the compositions of the present invention may be dissolved in hydrocarbon waxes at a rate far exceeding that required for the amorphous or low crystalline polymers.

In this example various polyvinyl isobutyl ether resins of varying degrees of crystallinity are added to melted refined paraffin wax (melting point 141° F.) while stirring with a four-bladed stirrer at 300–400 r.p.m. The temperature during the mixing is held between 110–120° C. The times are then noted for effecting complete solution of the polymers in the wax. The results are tabulated below.

TABLE 3

| Sample | Conc., Percent | Percent Relative Crystallinity | Time (min.) to Complete Solution |
|---|---|---|---|
| 1 | 10 | 20.8 | 60 |
| 2 | 10 | 10.0 | 180 |
| 3 | 10 | 14.0 | 65 |
| 4 | 10 | <2 | >360 |
| 5 | 2 | 20.8 | 45 |
| 6 | 2 | 19.2 | 45 |
| 7 | 2 | 10.0 | 150 |
| 8 | 2 | 2 | 300 |
| 9 | 2 | 14.0 | 50 |

The data above clearly establishes that for polymers other than those contemplated in the compositions of the present invention, the times for complete solution in hydrocarbon wax are inordinately long, whereas for the polymers used in the compositions of this invention, not only are the times considerably less but differ by a factor of from about 3 to 6 times less than the amorphous and low percent relative crystallinity polymers.

Example 5

The peel adhesion of the compositions of the present invention is outstandingly superior to unmodified hydrocarbon waxes and this is demonstrated by the following experimental data.

Peel adhesion specimens are prepared by applying a thin coating of the polymer wax blends set forth in the following table between cellophane, polyethylene, aluminum foil and Mylar (polyethylene terephthalate polyester film). After application of the coating a uniform adhesive layer is obtained by drawing the specimen across the heated hot plate while applying a 1 lb. weight. The specimens are conditioned one week at 23° C. and 50% relative humidity before testing on the Instron machine for peel adhesion. In Table 4 there appears the various compositions used and in Table 5 the results of the average peel strength in lb./sq. in. of specimen width.

TABLE 4.—WAX BLENDS FOR QUANTITATIVE PEEL ADHESION

| Composition | Parts Polymer | Parts Paraffin Wax (M.P. 141° F.) | Percent Rel. Cryst. of Polymer |
|---|---|---|---|
| A | 0 | 100 | |
| B | 10 | 100 | 20.8 |
| C | 10 | 100 | 10.0 |
| D | 10 | 100 | 0.0 |

TABLE 5.—AVERAGE PEEL STRENGTH (LBS./IN. WIDTH)

| Composition | Substrate | | | |
|---|---|---|---|---|
| | Cellophane | Polyethylene | Aluminum | Mylar |
| A | <0.01 | <0.01 | 0.025 | <0.01 |
| B | 0.05 | 0.16 | 0.29 | 0.03 |
| C | 0.08 | 0.07 | 0.22 | 0.03 |
| D | 0.11 | 0.06 | 0.23 | 0.04 |

The above data demonstrates that each of the compositions B, C and D are far superior to the unmodified paraffin wax, and while amorphous polyvinyl isobutyl ether is superior on cellophane and about equal on Mylar to the 20% relative crystalline polymer, on polyethylene and aluminum foil the latter is outstanding and the overall results with the 20% relative crystalline polymer indicate that it would not only be quite satisfactory on cellophane but by far the first choice on polyethylene and aluminum, and of equal advantage vis-a-vis the amorphous material on Mylar.

The same test carried out using kraft paper demonstrates that composition B is about 30% better than unmodified paraffin wax and somewhat better than compositions C and D.

Still another outstanding feature of the compositions of the present invention lies in the improved torsional flexibility characteristics of the films prepared from such compositions. In the following example this is demonstrated at temperatures of 75° F. and —40° F. at concentrations of 20 and 35 parts resin per 100 parts of paraffin wax.

*Example 6*

Films 12 to 16 mils in thickness are prepared from refined paraffin wax, melting point 141° F., and blends containing 20 and 35 parts, respectively, per 100 parts of the same paraffin wax of polyvinyl isobutyl ether having a percent relative crystallinity of 20.8. This polymer also is characterized by an intrinsic viscosity of 2.08. The films are prepared by hot melt drawdown technique. They are cut into 1" x 3" specimens and placed in the torsional flex apparatus which is designed to measure torque in degrees deflection on the specimen for a given load. As mentioned above, this torque is measured at +75° F. and —40° F. The breaking loads for each blend are given in the following table.

TABLE 6.—TORSIONAL BREAKING LOAD IN GRAMS

| Composition | +75° F. | —40° F. |
|---|---|---|
| Wax | 10 | 15 |
| Wax+20 phr.* polymer | 15 | 20 |
| Wax+35 phr.* polymer | 19 | 23 |

*Parts per hundred parts.

Once again the improvement in the above physical characteristic of the films is evident, and this contrasts with no noticeable improvement being manifested where the partially crystalline polymer is replaced by amorphous polyvinyl isobutyl ether.

*Example 7*

Example 1 is repeated employing the following waxes:
(A) Refined paraffin wax, M.P. 120° F.
(B) Refined paraffin wax, M.P. 153° F.
(C) Scale wax, M.P. 128° F.
(D) Microcrystalline wax, M.P. 147° F.
(E) Microcrystalline wax, M.P. 161° F.
(F) Microcrystalline wax, M.P. 180° F.
(G) Polyethylene wax (M.W. 3000), M.P. 230° F.

*Example 8*

Example 7 is repeated employing in place of 5 parts resin, the following amounts:
(A) 1 part
(B) 10 parts
(C) 20 parts
(D) 35 parts
(E) 50 parts
(F) 100 parts In the above Examples 7 and 8 the results generally conform to those obtained in Example 1.

*Example 9*

Example 2 is repeated using a microcrystalline wax, M.P. 161° F., and a polyethylene wax (of Example 7G). The viscosity increases are comparable to those of Example 2. The resin of Example 2 has an intrinsic viscosity of 1.9.

*Example 10*

Example 3 is repeated employing the resin in amounts of 5, 10, 30 and 50 parts per hundred parts of wax. Excellent results are obtained. The resin of Example 3 has an intrinsic viscosity of 2.1.

*Example 11*

Examples 3 and 10 are repeated using polyvinyl isobutyl ether resins of the following characteristics:

| Percent relative crystallinity: | Intrinsic viscosity |
|---|---|
| 14.0 | 1.50 |
| 17.1 | 3.48 |
| 19.2 | 2.18 |
| 21.3 | 1.66 |
| 25.7 | 4.1 |

Again excellent results are achieved.

*Example 12*

Examples 3, 10 and 11 are repeated using in place of the refined paraffin wax of those examples, the waxes of Example 9.

*Example 13*

Example 5 is repeated using the following waxes with the indicated amounts of polymer of Example 5 (20.8%. Rel. Cryst.):

| | Polymer, parts |
|---|---|
| (A) Refined paraffin wax, M.P. 153° F. | 5 |
| (B) Refined paraffin wax, M.P. 153°F. | 25 |
| (C) Microcrystalline wax, M.P. 166° F. | 10 |
| (D) Microcrystalline wax, M.P. 166° F. | 30 |
| (E) Polyethylene wax (M.W. 2000) | 10 |

The polyvinyl isobutyl ether resin used in this example has an intrinsic viscosity of 2.08.

*Example 14*

Example 13 is repeated using polyvinyl isobutyl ether resins of Example 11. The crystalline polymers with which the present invention is concerned give outstanding results.

*Example 15*

As has been previously described, the compositions of the present invention have many advantageous characteristics. Still another lies in the "hot tack" properties thereof. This permits ready lamination of various coated substrates. It is of course obvious that the coatings should not exhibit "blocking" under ordinary ambient conditions. To demonstrate this property, ordinary bread wrap is coated with refined paraffin wax (M.P. 141° F.) and also blends with 20 and 35 phr. of polyvinyl isobutyl ether resin (relative crystallinity=20.8%; intrinsic viscosity=2.08). Using 1" strips of opposite-sides coated paper placed between uncoated paper, adhesion temperatures are determined on a Blocking Temperature Apparatus (BTA) as outlined in TAPPI F 652–sm 60. The BTA is adjusted to a temperature gradient of 2° C./inch with a range of 24 to 84° C. After conditioning 17 hours, the specimens are removed from the block, cooled in air for 15 minutes and then stripped apart slowly from the low temperature end. The temperature at which adhesions occur is noted. With unmodified wax coatings there is no adhesion either (1) coating to paper or (2) coating to coating. With the polymer there is adhesion coating to paper at about 75° C. (20 phr.) and at 80° C. (35 phr.). This indicates excellent laminating characteristics but no blocking under normally expected environmental conditions of temperature. At 35 phr. there is coating to coating adhesion at about 60° C. which is still quite satisfactory and would permit of the lamination of layers of coated substrate. With amorphous polyvinyl isobutyl ether there is no adhesion at 10 phr. and concentrations above this could not be obtained after about 10 hours.

The tremendous, oustanding and unexepected advantages of the compositions of the present invention have been demonstrated by data representing many different physical characteristics, using representative products from among the hydrocarbon waxes and the partially crystalline polyvinyl isobutyl ether resins. The improvements which flow from the use of the latter materials may also be manifested in blends with polyolefinic resins of high molecular weight, too. Such products as polyethylene, low and high density of molecular weights above about 5000 and preferably above about 20,000 and having a percent relative crystallinity of above about 50% and which form flexible, self-sustaining films, fibers and the like, polypropylene resins of similar characteristics and the like are illustrative of this class of polyolefin resins.

Other variations in and modifications of the described processes which will be obvious to those skilled in the art can be made in this invention without departing from the scope or spirit thereof.

We claim:

A composition comprising (a) a paraffin wax having a melting point of from about 118° F. to about 155° F. and (b) polyvinyl isobutyl ether having a crystallinity of from at least about 14% to about 30%, where the weight ratio of ether to wax is about 1–35 parts of polyvinyl isobutyl ether per 100 parts of paraffin wax.

References Cited

UNITED STATES PATENTS

| | | | |
|---|---|---|---|
| 2,594,547 | 4/1952 | Fischer | 260—28.5 |
| 2,647,100 | 7/1953 | Salditt | 260—28.5 |
| 2,697,084 | 12/1954 | Eger | 260—28.5 |
| 3,023,198 | 2/1962 | Nowlin | 260—28.5 |
| 3,159,613 | 12/1964 | Vandenburg. | |
| 3,193,541 | 7/1965 | Ketley. | |
| 3,260,698 | 7/1966 | Makano. | |

MORRIS LIEBMAN, *Primary Examiner.*

JULIUS FROME, *Examiner.*